Feb. 19, 1957  A. K. MANN ET AL  2,781,743
ELECTRO-HYDRAULIC SERVO MECHANISM FOR CONTROL OF
ROLL, PITCH AND YAW OF A GUIDED MISSILE
Filed June 24, 1948  4 Sheets-Sheet 1

ROLL AMPLIFIER

INVENTORS.
ALFRED K. MANN
EDWARD P. NEY
LELAND B. SNODDY

BY
ATTORNEY

DITHER UNIT

CONTROL AMPLIFIER

A.C. POWER SUPPLY

VIBRATOR

*INVENTORS.*
ALFRED K. MANN
EDWARD P. NEY
LELAND B. SNODDY

BY *J.D.O'Brien*

ATTORNEY

INVENTORS.
ALFRED K. MANN
EDWARD P. NEY
LELAND B. SNODDY

BY
ATTORNEY

United States Patent Office 2,781,743
Patented Feb. 19, 1957

2,781,743

ELECTRO-HYDRAULIC SERVOMECHANISM FOR CONTROL OF ROLL, PITCH AND YAW OF A GUIDED MISSILE

Alfred K. Mann, New York, N. Y., Edward P. Ney, Minneapolis, Minn., and Leland B. Snoddy, Charlottesville, Va., assignors to the United States of America as represented by the Secretary of the Navy Application June 24, 1948, Serial No. 35,051

1 Claim. (Cl. 121—41)

The present invention relates to a stabilization system particularly adapted for use for controlling guided missiles.

One object of the invention is to provide a method and means for shifting aerodynamic and other steering devices, such as air foils, upon occurrence of incipient angular deviation of the missile from its intended condition and course, as by rolling, yawing or pitching, or any combination of these, to counteract such tendency to deviate and thus to prevent the error from exceeding a certain preset maximum value.

A specific object is to provide a control means, based on a gyroscope, for providing the actions requisite for roll stabilization, said means including mechanical, electrical and hydraulic elements.

Another specific object is to provide a directional or "phased" source of power that is derived from the difference between an error voltage and a correcting voltage, to be used in setting the deviation correcting means into proper condition to cause the vehicle to resume its intended condition and/or course.

While the invention may be embodied in many forms and covers stabilization in general, the present disclosure is based more particularly on roll-stabilization and specifically on an embodiment at present preferred, without however thereby limiting the scope of said invention in any way.

While roll-stabilization is discussed in detail, most of the mechanisms and circuits apply equally well to stabilization against yaw and pitch, and moreover certain elements may serve in common for several purposes within the same system.

The preferred embodiment is described herein and illustrated in the accompanying drawings, wherein.

Figure 1:
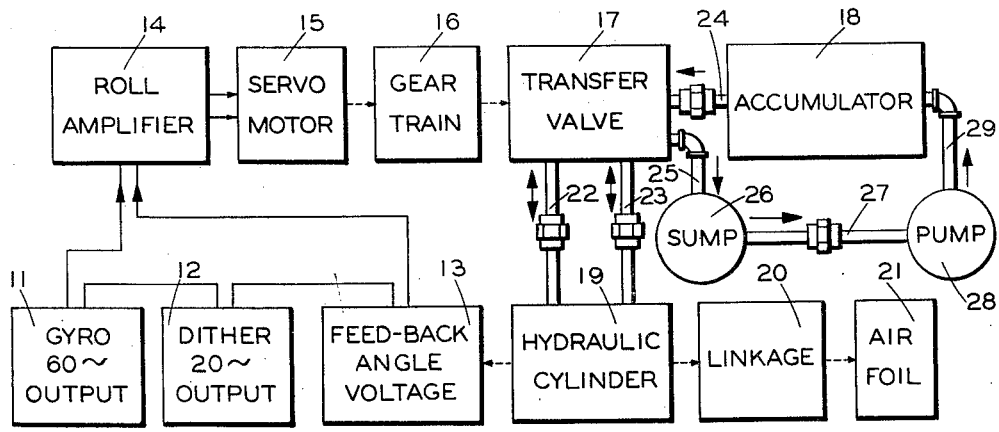
Fig. 1 is a block diagram of the complete roll-stabilization system.

Referring first to Fig. 1, in order to obtain an understanding of the general nature and the purposes of the invention, the roll-stabilization system carried by a guided missile or other vehicle consists of a gyroscope 11 having an electrical pickoff coacting therewith, and located in, for example, a conventional sixty-cycles-per-second field, so adjusted that when the gyroscope is in "normal" position no voltage will be induced in the pickoff. However, for small angular deviations, 60 cycle alternating voltages nearly proportional to the error angle then will be produced. In Fig. 1, the dashed lines represent mechanical connections, the solid lines electrical connections, and the double lines fluid conduits. The arrow heads indicate the direction of control or of flow.

A dither unit 12 is producing continuously an alternating voltage of a constant magnitude and of a frequency which is relatively low in comparison with the operating frequency of the system as a whole, say 20 cycles per second, which is used to keep up a continual oscillation of a valve spindle, to reduce the effect of static friction on said spindle.

A feed-back angle unit 13 produce a 60 cycle voltage proportional to the displacement of a piston, in a hydraulic cylinder 19, said three voltages being all fed in series into the input terminals of the roll amplifier 14, but with the feed-back voltage opposing the gyroscope pickoff voltage.

The amplifier 14 has an output voltage which is then approximately proportional to the difference between the voltage of the error signal and that of the feed-back signal, and yields power that is of sufficient magnitude to energize one phase of the two-phase servo motor 15, the other phase being energized directly by the 60 cycle power source.

Figure 9:
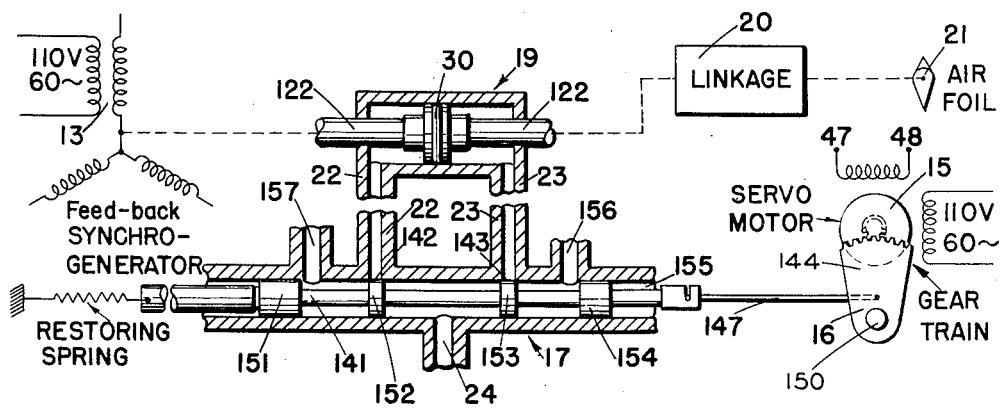
Fig. 9 is a diagrammatic axial section through the transfer valve and the hydraulic cylinder, the associated apparatus being shown.

This servo motor 15 operates the transfer valve 17 through the gear train or other mechanical connection 16. This valve 17 controls the flow of pressure fluid from the outlet 24 of an accumulator 18 to a hydraulic cylinder 19. The valve 17 will supply pressure fluid through conduits 22 and 23, to one end or the other of the cylinder 19, thereby causing the piston 30 (Fig. 9) therein to move to right or left, actuating both the source of feed-back angle voltage 13 and the air foil or other steering device 21, the latter being connected mechanically to the said piston through any suitable linkage 20. When the valve 17 is in its neutral position, as shown in Fig. 9, conduits 22 and 23 are both shut off and therefore at such times the piston is not actuated in either direction.

While it is possible to obtain satisfactory operation by discharging the oil or other pressure fluid to waste, after leaving the cylinder 19, in some cases it may be desirable, or perhaps essential, to save it for repeated use, by returning it to the accumulator 18. This may be done by adding a sump 26 and a gear pump 28, the latter being driven by any suitable means such as a motor, suitable conduits 25, 27 and 29 connecting these elements to the valve 17 and accumulator 18. Thus, in missiles which are to fly long distances it may be highly important to conserve the oil by recirculating it, thereby saving both weight and volume. On the other hand, for short-range vehicles, the savings in weight, volume and complication secured by eliminating the sump, motor, and pump may far outrank in importance the saving in oil, since even the total quantity of oil consumed is small for short flights.

With this general outline of the system as a background, the details thereof will now be described.

Figure 2:
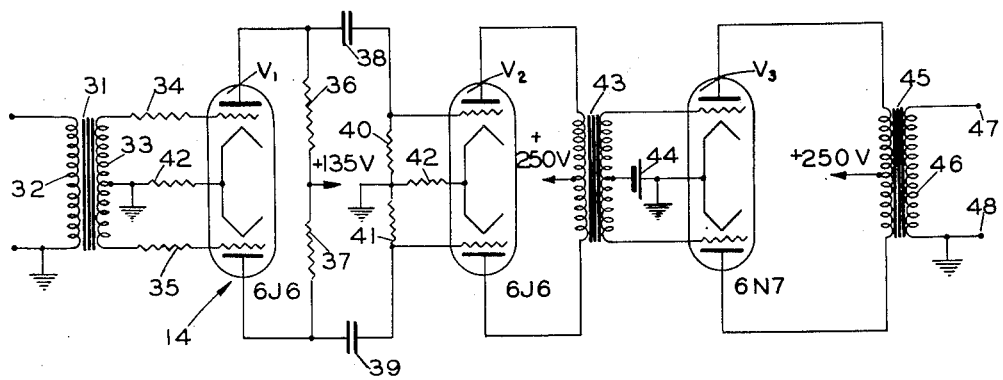
Fig. 2 is a diagram showing the wiring of the roll-amplifier.

The roll amplifier 14 is shown in Fig. 2 as comprising an input transformer 31 having an input or primary winding 32, and a center-tapped output or secondary winding 33, which is connected through suitable resistors 34 and 35, each 43,000 ohms, to the grids of a dual triode $V_1$. The anodes of $V_1$ are connected to the positive terminal of a suitable source of electrical power, here shown as 135 volts, through the anode resistors 36 and 37, likewise 43,000 ohms each, and the anodes are coupled to the input grids of a second dual triode $V_2$ through suitable capacitors 38 and 39, each 0.05 mfd., with the customary 0.5 megohm grid resistors 40 and 41. Cathode resistors are shown at 42, 42, each suitably 500 ohms.

A third dual triode $V_3$ is provided with a transformer 43 providing the coupling between $V_2$ and $V_3$ as shown. A source 44 of grid bias is indicated. Usually the three dual tubes just described afford sufficient amplification. An output transformer 45 is provided, having a secondary winding 46, at the terminals 47 and 48 of which considerable power is available, of the order of 20 watts for instance, at a varying voltage suitable to energize the "variable" phase of the servo-motor 15.

While details of the amplifier have been described, as well as suggested values of the constants and tube types, it may be remarked that within reasonable limits any conventional amplifier, of sufficient power, may be used. As will be seen from the block diagram, Fig. 1, this amplifier 14 receives its input from the gyroscope, dither, and feed-back units 11, 12 and 13, jointly. It has its output terminals 47 and 48 connected to a winding of the two-phase servo-motor 15, to energize one phase thereof. The other phase is supplied to the motor directly from the original source of 60 cycle current, a phase difference of substantially 90° being maintained between this and the amplifier output in any desired way.

Figure 3:
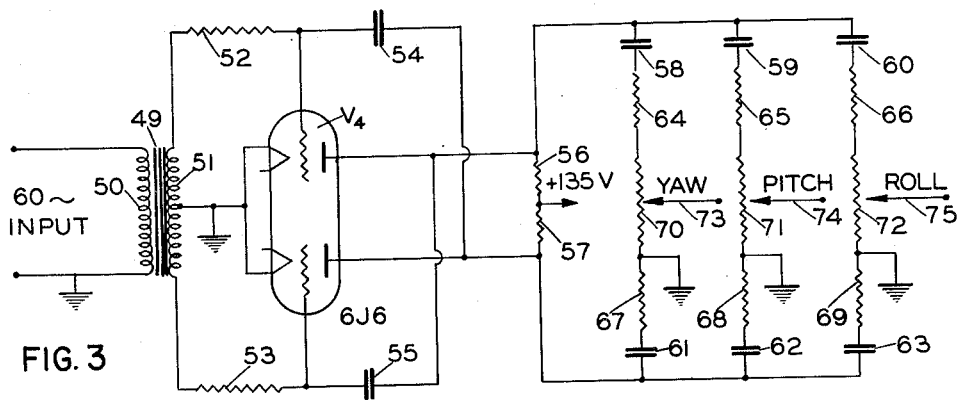
Fig. 3 shows the wiring of the dither unit, constituted by a multivibrator circuit, used to provide relatively low-frequency current variations in a part of the system.

The dither unit 12 is shown in detail in Fig. 3. It will be seen that this device is essentially a multivibrator based on a dual triode $V_4$. It comprises an input transformer 49 having a primary winding 50 that is fed from the 60 cycle source, to cause that transformer to deliver triggering pulses from its secondary winding 51 to the grids of dual triode $V_4$. The circuit constants of the multivibrator are so chosen that normally the frequency produced thereby would be a little lower than a desired sub-multiple of 60 cycles, say 18 or 19 cycles, whereupon the triggering pulses will synchronize the multivibrator with the desired sub-multiple, in this case 20 cycles per second. This frequency is used to dither the transfer valve, since it does not interfere with the 60 cycle power that operates the servo-motor 15.

A set of multivibrator circuit constants that have been found suitable, when a type 6J6 tube is used as the dual triode $V_4$, consists of 2.7 megohm grid resistors 52 and 53, and 0.0045 mfd. capacitors 54 and 55. The resistors 56 and 57 may be 50,000 ohms each, with +135 volts applied at their common junction, as shown.

It will be noted that while the details of the present disclosure concern chiefly roll stabilization, a single multivibrator will supply the dithering impulses for yaw and pitch stabilization also, as indicated on the drawings.

The three output circuits shown, for dithering the yaw, pitch and roll devices, are, or may be, exactly alike, each of the capacitors 58, 59, 60, 61, 62 and 63 being 0.1 mfd., and each resistor 64, 65, 66, 67, 68 and 69 being 100,000 ohms. The "potentiometers" 70, 71 and 72 are suitably 200 ohms each, grounded at one end as indicated, the dithering voltages for yaw, pitch and roll being taken off between the ground and the sliders 73, 74 and 75 respectively, and fed to the corresponding amplifiers. It will be understood, of course, that the values given are merely suggestive and not in any sense restrictive.

The pitch and yaw control systems are identical with one another and differ from the roll system in the following respects. The sensitive element, that is, the device that produces the original control signal, is not a gyroscope, but a radio or radar receiver, operating in conjunction with transmitters located on the ground. The pitch and yaw systems have across their amplifier input terminals the direct current signal output of the said receiving units, and hence somewhat different amplifiers are used, and herein called "control" amplifiers, the circuits of a typical one being disclosed.

Figure 4:
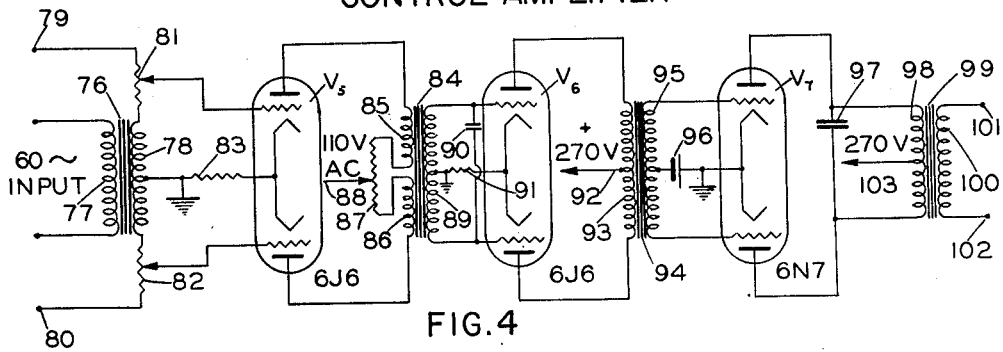
Fig. 4 is a diagram of the circuits of a control amplifier that replaces the roll-amplifier in the yaw and pitch stabilization systems.

The control amplifier circuit details are shown in Fig. 4. The input stage, based on a dual triode $V_5$, has an input transformer 76, the primary winding 77 of which is fed with alternating current, here assumed to be 60 cycle current. The terminals 79 and 80, which connect to the secondary winding 78 through the 10 megohm voltage dividers 81 and 82, commonly called potentiometers, receive the rectified output of a radio receiver, which is carried by the vehicle and is controlled from the ground, or by a radio beam. This will thus impress on the grids of $V_5$ both an A. C. signal and a D. C. bias, the latter being derived from the radio receiver, as above mentioned, and suitable grid bias being secured by means of the 500 ohm cathode resistor 83. The output of $V_5$ thus will vary in magnitude and in relative polarity, that is, if the rectified error signal fed to terminals 79 and 80 changes polarity, there will be a phase shift of 180° in the output of $V_5$.

The output of $V_5$ is fed to the grids of a second dual triode $V_6$ by means of a coupling transformer 84. This has a divided primary winding 85, 86 with a 20,000 ohm resistor 87 interposed therein, suitable alternating current, say of 110 volts 60 cycles, being fed into said resistor 87 by a slider 88, which may be adjusted to secure proper balance. The center-tapped secondary winding 89 is shunted by a capacitor 90, of about 0.1 mfd. The grid bias may be secured by a 500 ohm. cathode resistor 91. It will be noted that the circuits of $V_5$ are operated by alternating power in place of the customary direct current supplies.

The tube $V_6$ however is energized by 270 volt direct current, supplied to its anodes through the halves of the center-tapped primary winding 93 of a transformer 94, from the conductor 92 leading to the positive terminal of a power supply. The center of the secondary winding 95 is connected to the cathodes of a third dual triode $V_7$, through a source 96 of grid bias voltage, while the secondary terminals lead to the grids of the tube. The anodes are supplied with direct current at 270 volts from the wire 103, through the halves of the center-tapped primary winding 98 of an output transformer 99, a capacitor 97, which may be 0.01 mfd., being shunted across said anodes. The secondary winding 100 of said transformer 99 delivers the output power from its terminals 101 and 102, which supply the "variable" phase of the servo motor in the yaw and pitch systems in place of the terminals 47 and 48 of the roll amplifier. From there on, the three systems may be exactly the same.

In any case, means are provided to produce substantially a 90° phase shift between the energy output of the respective amplifier and the energy supplied directly by the alternating current power supply, if such phase shift is not already inherent in the amplifier, so that the servo motor 15 may receive the requisite two-phase power.

Figure 5:
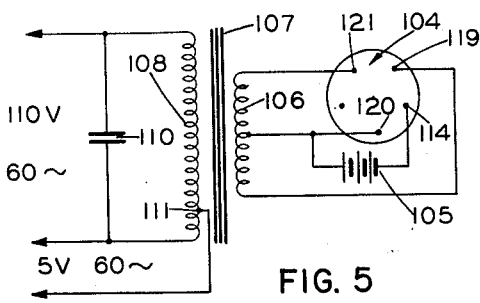
Fig. 5 is a diagram showing the electrical circuits of a power supply which may be used to provide alternating current for energizing the system.
Figure 6:
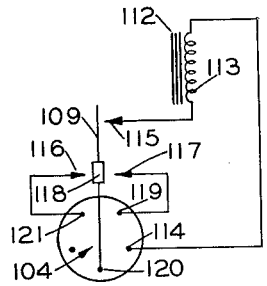
Fig. 6 is a detail of a mechanical-reed vibrator element and its wiring, used in the power supply.

Figures 5 and 6 show the circuits of a power supply for providing alternating current. It consists of a vibrator 104 operated by a storage or other battery 105, and delivering alternating current to the center-tapped primary winding 106 of a transformer 107. The secondary winding 108 of this transformer delivers, for example, 110 volts, and the frequency of the reed 109 of the vibrator is selected or adjusted to 60 cycles per second. An 8 mfd. capacitor 110 serves to eliminate much of the higher harmonic content of the vibrator output, by partly short-circuiting it. A tap 111 on the winding 108 conveniently yields 5 volts, as shown.

The reed 109 is maintained in vibration by the electromagnet 112 whose winding 113 has one terminal 114 connected to one pole of the battery 105 and terminates at its other end in the contact point 115 which coacts with the reed 109 in the usual way. The contact points 116 and 117 coact with the heavy-duty contact 118 carried by the reed 109, to complete circuits alternately through the two halves of the primary winding 106, through terminals 119, 120, and 121, as shown.

Figure 7:
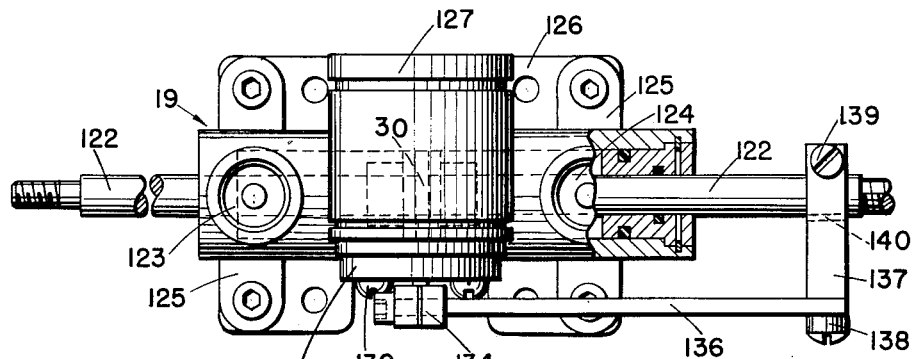
Fig. 7 is a plan of the hydraulic motor and the synchrogenerator connected thereto.
Figure 8:
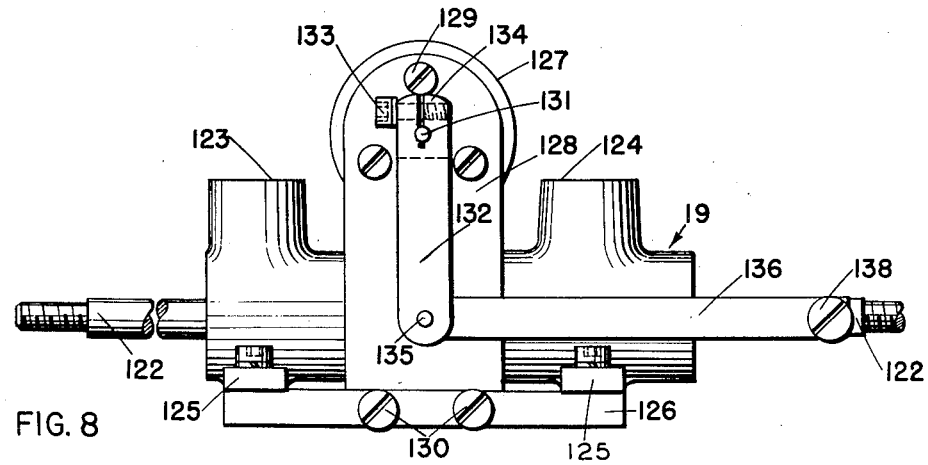
Fig. 8 is a corresponding elevation of the arrangement shown in Fig. 7.

Referring next to Figs. 7 and 8, there is shown the hydraulic cylinder 19 in which reciprocates the piston 30, mounted on rod 122. Fluid connections 123 and 124 are provided at the ends of the cylinder, to receive the pipes 22 and 23 of Figs. 1 and 9. Under control of the transfer valve 17, fluid from the accumulator 18 will thus be supplied to one end or the other of the cylinder, at proper times, to cause the piston rod 122 to assume the corresponding position. A corresponding amount of fluid will, of course, be forced out of the other end of the cylinder and will then flow to waste, or into the sump for recirculation according to the system in use.

The cylinder 19, for convenience, may have mounting brackets 125 whereby it may be secured to a suitable base 126. A synchro-generator 127 may be mounted on a plate or bracket 128 by screws 129, said bracket itself being fastened to the hydraulic cylinder 19 by screws 130. A crank arm 132 may be secured to the shaft 131 of the synchro-generator by means of the screw 133 coacting with the slotted end 134 of the arm, the other end of the arm 132 being attached by a pivot 135 to one end of a link 136. The other end of link 136 is pivoted to a block 137 by means of a shouldered screw 138, said block itself being adjustably held to the piston rod 122 by a screw 139 coacting with a split or slotted end 140 of the block. The linkage just described will rotate the shaft 131 of the synchro-generator in accordance with the position of piston 30 in cylinder 19, both being shown in "neutral" position in Figs. 7 and 8.

Figure 10:
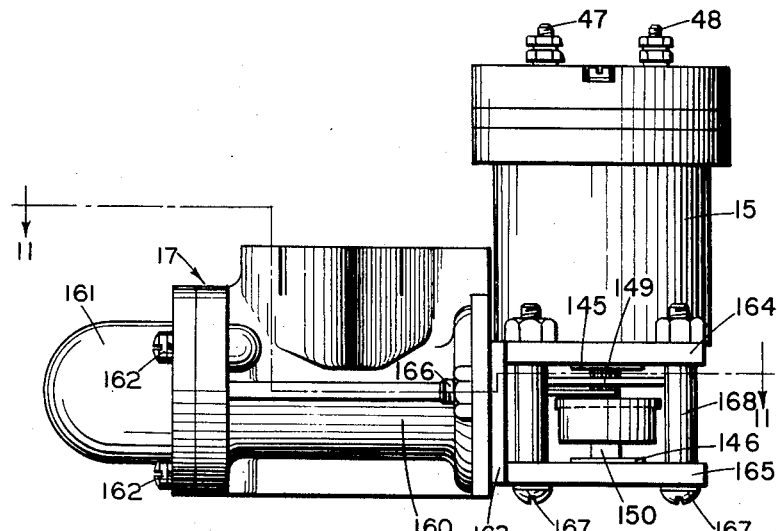
Fig. 10 is a side elevation of the servo-motor, gear train and transfer valve.
Figure 11:
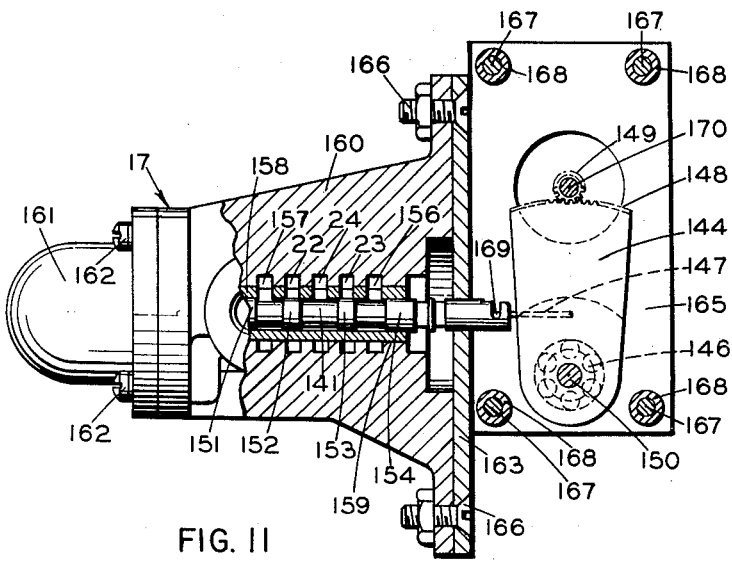
Fig. 11 is a sectional view, partly in elevation, of the structure along line 11—11 of Fig. 10.

The transfer valve 17 and its associated mechanism are shown in Figs. 9, 10 and 11 in sufficient detail to make the operation clear. The valve comprises a reciprocable rod 141 with suitable configuration to coact with the ports 142 and 143 to control the flow of high-pressure fluid, such as oil from the accumulator 18, to and from the hydraulic cylinder 19 already described.

This rod 141 is shifted by the gear segment 144, pivotally mounted by means of a shaft 150 carried by the upper and lower ball bearings 145 and 146 as shown, and connected to the rod 141 by a suitable link 147 and slot 169. The segment 144 has its teeth 148 in mesh with the pinion 149 secured to and operated by the shaft 170 of the servo-motor 15. The gear ratio may conveniently be 20:1. This may be a Kollsman two-phase motor, operating with nominally 110 volts on the fixed phase and about 75 volts maximum on the "variable" or control phase.

The structure of the hydraulic transfer valve 17 is shown in detail in Figs. 10 and 11 and its principle of operation is illustrated in Fig. 9. Referring to these figures, it will be seen that the rod 141 has enlarged portions 151, 152, 153 and 154 thereon, which fit liquid-tight in the bore 155 (Fig. 9). The medium under pressure is admitted to the central portion of bore 155 through conduit 24 (see also Fig. 1) but cannot pass either enlarged portion 152 and 153, when the valve is in the condition shown, where said portions close the ports 142 and 143, which lead to conduits 22 and 23.

However, when link 147 moves the rod 141 to the left or right, communication will be established from conduit 24 to conduit 22 or 23 respectively, and high-pressure oil will pass to the corresponding end of the cylinder 19, an equal amount being forced out of its other end and into the discharge conduit 156 or 157 respectively. Such oil will then flow through conduit 25 into the sump 26, if there be one, or to waste.

Structurally, the valve comprises a suitably ported sleeve 158 inserted into a corresponding bore 159 in a body casting 160 wherein are located the necessary passages to provide the various conduits already described. A protective cap 161 secured to one end of the body 160, as by the screws 162, covers the end of the valve rod 141 which may have a retracting spring (not shown) thereon to take up lost motion.

Suitable support for the servo motor 15 is provided by the bases 163, 164 and 165 as shown, secured to the valve body 160 by the screws 166, and to each other by the screws 167, the latter preferably having spacing tubes 168 thereon, to hold plates 164 and 165 properly spaced.

The operation is as follows:

When the axis of a missile carrying the system deviates angularly from the desired direction due to roll, the gyroscope 11 causes a voltage to be produced by its electrical pickoff, which may be of any conventional type, suitably a synchro-generator, having its rotor excited with 5 volt, 60 cycle current, as provided by the tap 111 of Fig. 5. The pickoff voltage is connected to oppose the feed-back voltage produced by the synchro-generator 127, specifically here a "Kollsman" transformer (shown as the source of feed-back angle voltage 13 in Fig. 1) actuated by the piston in the hydraulic cylinder 19. This feed-back voltage depends on the displacement of the piston and thus tends to balance the voltage generated by the gyroscope pickoff, which is initially responsible for such displacement of the piston. Thus the system does not tend to overshoot or hunt.

While the present specification mentions generically "synchro-generators," it will be understood that the devices embraced by this term are variously known in the art under the trade names Selsyn, Autosyn, Teletorque, and perhaps others, all of which are self-synchronous electric generators and/or motors, that are used to impart corresponding movements and settings to devices that may physically be remote from one another.

The dither 12 also provides a voltage, in series with the two just mentioned, but as it is of a far different frequency, it cannot either reinforce or weaken the resultant of the other two voltages. Its sole effect, after amplification, therefore, is to maintain a continual small vibration of the spindle 141 of the transfer valve 17, which diminishes the static friction that would otherwise decrease the sensitivity of control thereof.

The hydraulic cylinder 19 on the one hand actuates the feed-back voltage source 13, and on the other hand turns the airfoil 21 through a suitable linkage or gearing 20, in the proper direction to cause the medium surrounding the missile to correct the angular error of the missile in roll.

Both the roll amplifier of Fig. 2 and the control amplifier for pitch or yaw of Fig. 4 are designed to provide a 90° phase shift with respect to the initial alternating current power, so that they may provide properly phased control current. Reversal of angular error will reverse these currents, that is, shift their phases 180°, thereby reversing the direction of rotation of the motors they operate, since this 180° shift means a shift of 90° in one sense or the other with respect to the "stationary" phase.

While the roll-stabilization system has been described in detail, it will be understood that yaw and pitch stabilization are secured in almost the same way, except that the initial control is by means of a radio receiver or of a "beam rider." It should also be understood that while for convenience 60 cycle current is preferred, there is no reason why other frequencies cannot be employed equally well, for example, in any existing installations which may already have a supply that operates at even a much higher or lower frequency.

Having described our invention and disclosed one embodiment thereof, it should be understood that this disclosure is to be considered in an illustrative sense, and not as a limitation.

We claim:

In a stabilization system for an aerial vehicle such as a guided missile, equipped with deviation correcting means actuable in either one of two senses by a fluid servomotor, a source of alternating current of a given frequency, means generating a first alternating voltage signal of said given frequency and of a magnitude commensurate with the degree of said deviation and of a phase distinctive of the sense of said deviation, means generating a second alternating voltage signal of said given frequency and of a magnitude commensurate with the degree of actuation of said deviation correcting means and of a phase distinctive of the sense of actuation of said deviation correcting means, means generating a third alternating voltage signal of a frequency which is a sub-multiple of said given frequency, an amplifier having impressed on its input said third alternating voltage signal in series with the differential of said first and second alternating voltage signals, an electric servomotor having a first phase energized by said first mentioned alternating current source and a second phase energized by the output of said amplifier, and a transfer valve controlling said fluid servomotor and actuable in either of two senses by said electric servomotor whereby said third alternating voltage acting through said electric servomotor effects a dithering vibration of the transfer valve to reduce its static friction.

References Cited in the file of this patent

UNITED STATES PATENTS

| | | |
|---|---|---|
| 1,959,804 | Wittkuhns et al. | May 22, 1934 |
| 1,959,805 | Wittkuhns et al. | May 22, 1934 |
| 2,416,097 | Hansen et al. | Feb. 18, 1947 |